United States Patent
Iwata et al.

[11] Patent Number: 5,642,230
[45] Date of Patent: Jun. 24, 1997

[54] ZOOM FINDER

[75] Inventors: Noriyuki Iwata, Fujisawa; Yoshiko Shimada, Tokyo, both of Japan

[73] Assignee: Ricoh Company, Ltd., Tokyo, Japan

[21] Appl. No.: 93,747

[22] Filed: Jul. 19, 1993

[30] Foreign Application Priority Data

| Jul. 20, 1992 | [JP] | Japan | 4-192408 |
| Aug. 28, 1992 | [JP] | Japan | 4-230253 |
| Feb. 2, 1993 | [JP] | Japan | 5-015315 |

[51] Int. Cl.$^6$ .................................. G02B 15/14
[52] U.S. Cl. ............................ 359/690; 359/683
[58] Field of Search ................... 359/690, 683, 359/686, 687, 688

[56] References Cited

U.S. PATENT DOCUMENTS

| 3,415,592 | 12/1968 | Price | 359/690 |
| 3,972,592 | 8/1976 | Ruben | 359/690 |
| 4,118,108 | 10/1978 | Muszumanski | 359/690 |
| 4,725,130 | 2/1988 | Ozawa | 359/690 |
| 4,787,719 | 11/1988 | Imai | 359/690 |
| 5,028,125 | 7/1991 | Kikuchi | 359/683 |
| 5,052,787 | 10/1991 | Sugawara | 359/683 |
| 5,202,714 | 4/1993 | Iwata | 354/219 |
| 5,204,780 | 4/1993 | Sakamoto | 359/690 |
| 5,353,158 | 10/1994 | Matsuo | 359/688 |
| 5,400,101 | 3/1995 | Yoneyama et al. | 359/683 |

*Primary Examiner*—Georgia Y. Epps
*Assistant Examiner*—Michael A. Papalas
*Attorney, Agent, or Firm*—Oblon, Spivak, McClelland, Maier & Neustadt, P.C.

[57] ABSTRACT

A zoom finder has first to third lens groups sequentially arranged from an object side to an eye pupil side and performs a zooming operation by fixing the first and third lens groups and moving the second lens group. The first lens group is constructed by a positive single lens. The second lens group is constructed by a negative single lens. The third lens group has a positive combinational focal length and is constructed by a negative single lens arranged on the object side and a positive single lens arranged on the eye pupil side. A frame system of the zoom finder is formed by an eye pupil side lens face of the negative single lens of the third lens group and the positive single lens of the third lens group. Radii $R_1$ and $R_2$ of curvature of lens faces of the first lens group on the object and eye pupil sides satisfy the following condition.

$$0.8 < |R_1/R_2| < 1.2 \qquad (I)$$

At least one lens face of the first lens group is constructed by an aspherical surface.

11 Claims, 10 Drawing Sheets

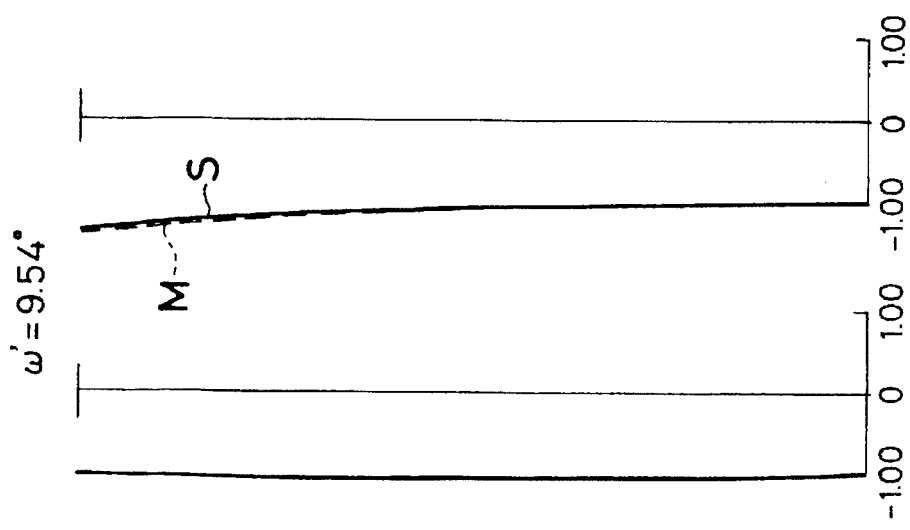
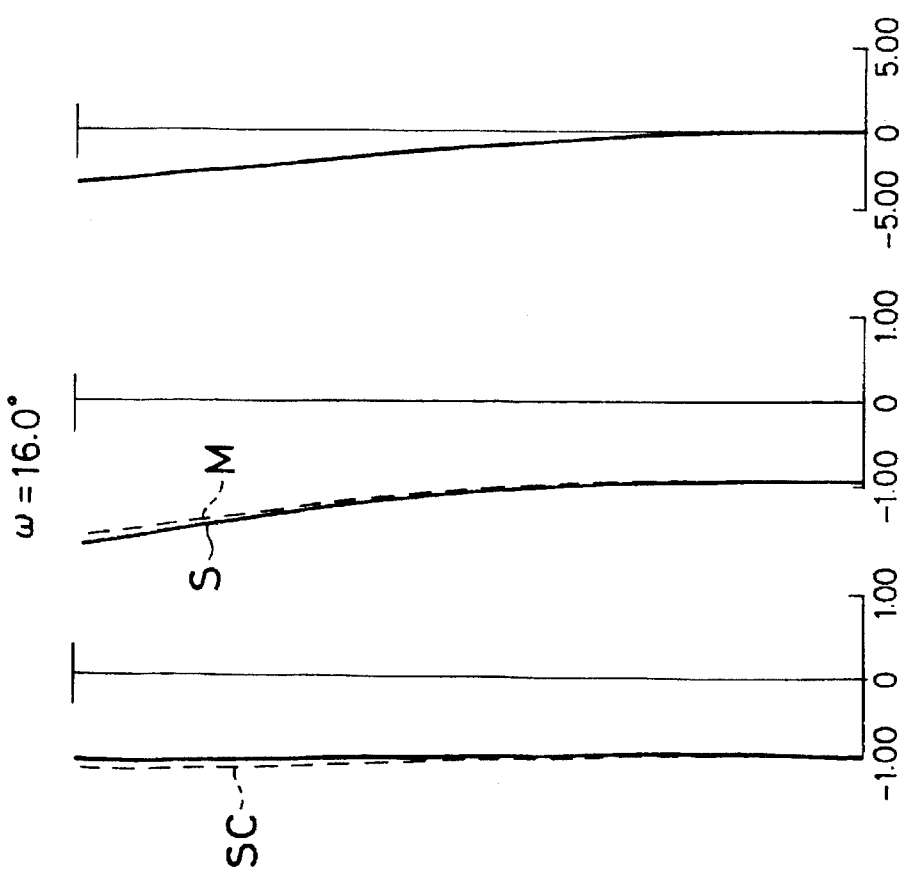

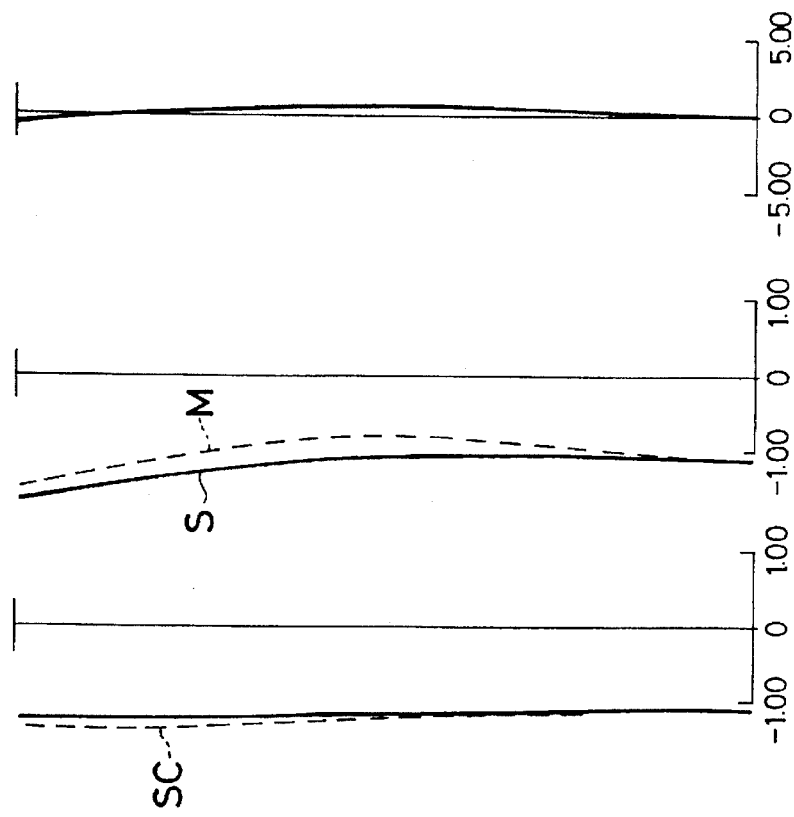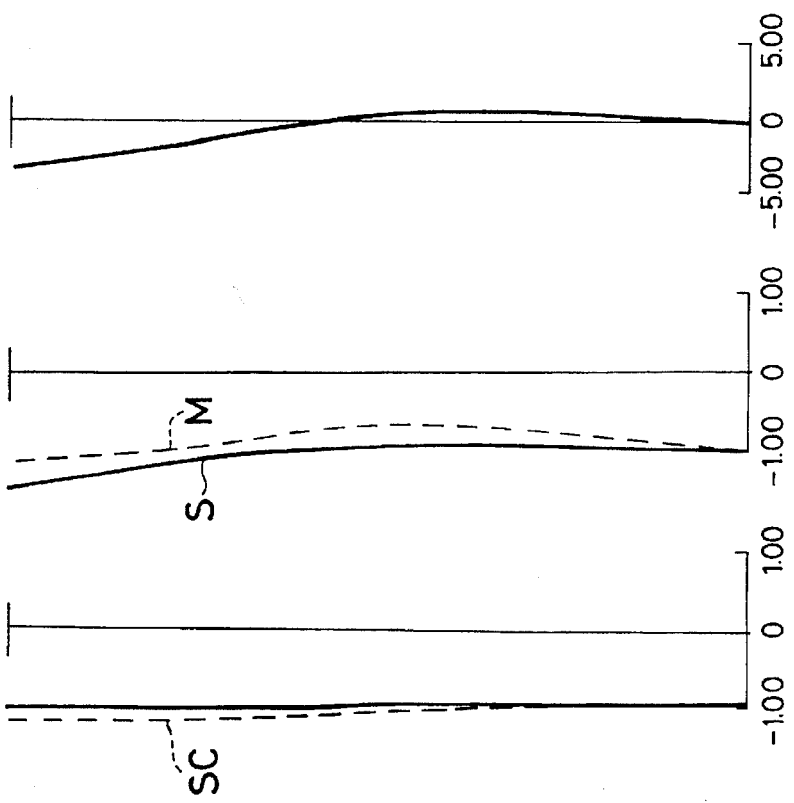

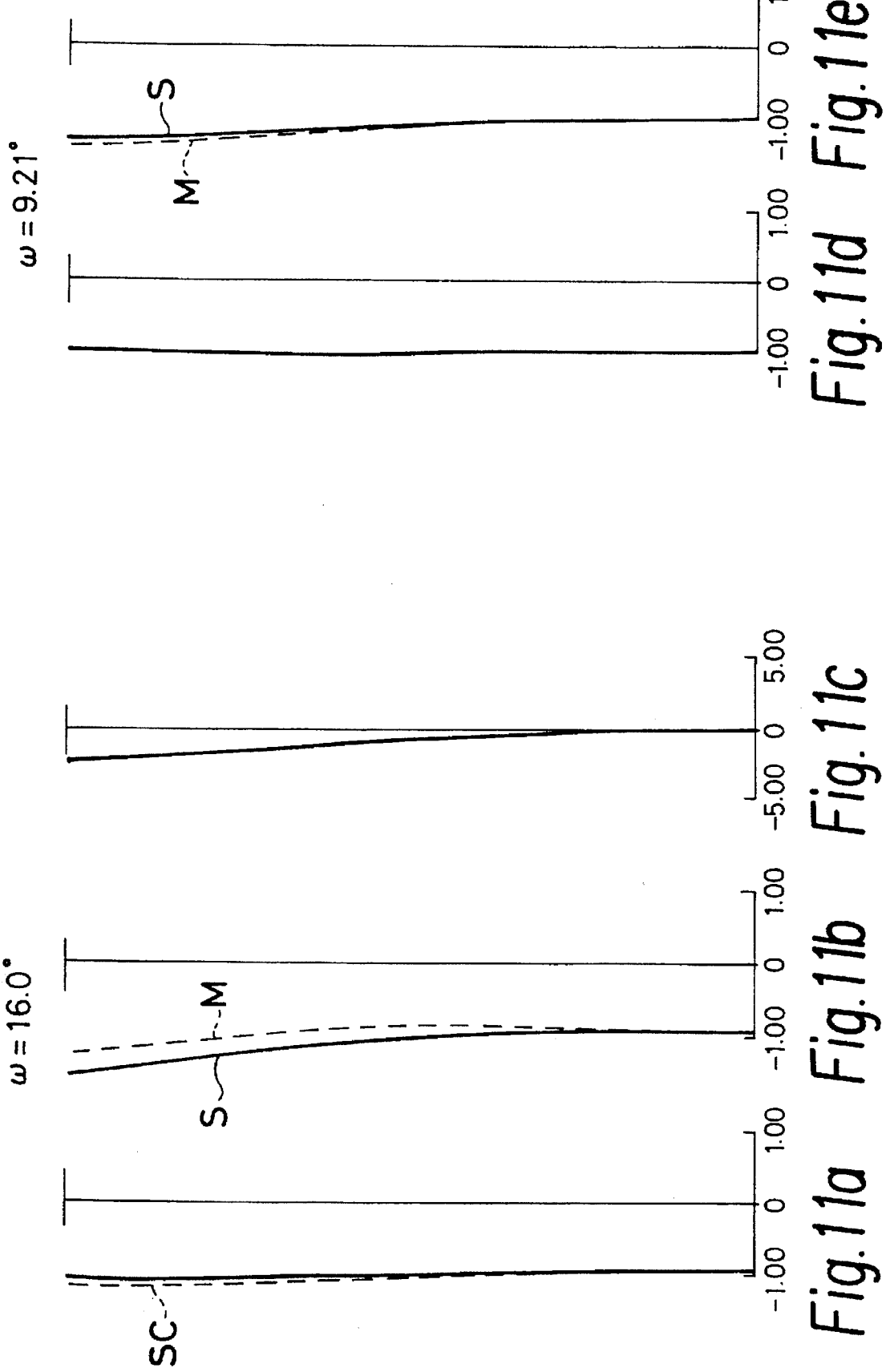

ZOOM FINDER

BACKGROUND OF THE INVENTION

1. Field of the Invention

The present invention relates to a zoom finder and can be utilized in finders of a lens shutter camera and a video camera.

2. Description of the Related Art

Various kinds of zoom finders used in a lens shutter camera are generally known. Recently, the lens shutter camera has been very compact in a high zoom ratio. Therefore, it is difficult to provide a high zoom ratio and compactness with respect to a general zoom finder.

SUMMARY OF THE INVENTION

It is therefore an object of the present invention to provide a novel zoom finder in which an entire length of the zoom finder can be effectively reduced a high zoom ratio can be obtained, and aberrations can be preferably corrected.

To achieve the above object, in the present invention, a zoom finder has first to third lens groups sequentially arranged from an object side to an eye pupil side and performs a zooming operation by fixing the first and third lens groups and moving the second lens group.

The zoom finder having each of first to fourth structures of the present invention is constructed as follows by four lenses in three lens groups as shown in FIG. 1.

The first lens group is constructed by a positive single lens L1. The second lens group is constructed by a negative single lens L2.

The third lens group has a positive combinational focal length and is constructed by a negative single lens L3 arranged on the object side and a positive single lens L4 arranged on the eye pupil side. A frame system of the zoom finder is formed by an eye pupil side lens face of the negative single lens L3 and the positive single lens L4. Namely, the frame is formed on an object side face of the lens L4. An image of this frame reflected on a half mirror formed on the eye pupil side face of the lens L3 is enlarged and observed by the lens L4.

In the zoom finder having the first structure, radii $R_1$ and $R_2$ of curvature of lens faces of the positive single lens L1 of the first lens group on the object and eye pupil sides satisfy the following condition.

$$0.8 < R_1/R_2 | < 1.2 \tag{1-I}$$

At least one lens face of the first lens group is constructed by an aspherical surface.

In the zoom finder having the second structure, a focal length $f_{3N}$ of the negative single lens L3 of the third lens group and a radius $R_6$ of curvature of the eye pupil side lens face of the negative single lens L3 in the first structure satisfy the following condition.

$$0.15 < |f_{3N}|/R_6 < 0.2 \tag{1-II}$$

In the zoom finder having the first or second structure, the positive single lens L1 of the first lens group is constructed by a biconvex lens in accordance with the third structure of the present invention. The negative single lens L2 of the second lens group is constructed by a biconcave lens in the third structure. The negative single lens L3 of the third lens group is constructed by a biconcave lens in the third structure. The positive single lens L4 of the third lens group is constructed by a flat convex lens in the third structure. In this case, each of second, fourth, fifth, sixth and eighth lens faces of the zoom finder counted from the object side is constructed by an aspherical surface in accordance with the fourth structure of the present invention.

The zoom finder having each of fifth to ninth structures of the present invention is constructed as follows by five lenses in three lens groups as shown in FIG. 6.

A first lens group is constructed by a positive single lens L10. A second lens group is constructed by a negative single lens L20.

A third lens group has a positive combinational focal length and is constructed by a negative single lens L30, a positive single lens L40 and a positive single lens L50 sequentially arranged from an object side to an eye pupil side.

A frame system of the zoom finder is constructed by a half mirror formed on an eye pupil side lens face of the positive single lens L40 and a frame formed on an object side lens face of the positive single lens L50. Namely, the frame is formed on the object side face of the single lens L50. An image of this frame reflected on the half mirror formed on the eye pupil side face of the lens L40 is enlarged and observed by the lens L50.

In the zoom finder having the sixth structure, a focal length $f_{3N}$ (<0) of the negative single lens L30 of the third lens group, a focal length $f_{3P}'$ of the positive single lens L40, and a distance $d_{12}$ between a rear principal point of the negative single lens L30 and a front principal point of the positive single lens L40 satisfy the following conditions.

$$|f_{3N}|/f_{3P}' < 0.5 \tag{2-I}$$

and $$d_{12}/f_{3P}' < 0.1$$

In the zoom finder having the seventh structure, the focal length $f_{3N}$ of the negative single lens L30 and a combinational focal length $F_3$ of the third lens group in the fifth or sixth structure satisfy the following condition.

$$0.08 < |f_{3N}|/F_3 < 0.1 \tag{2-II}$$

In the zoom finder having the seventh structure, the positive single lens L10, the negative single lens L20, the negative single lens L30 of the third lens group, the positive single lens L40, and the positive single lens L50 in the eighth structure are respectively constructed by a biconvex lens, a biconcave lens, a biconcave lens, a positive meniscus lens having a convex face on the object side, and a flat convex lens. In this case, in accordance with the ninth structure, each of second, fourth, fifth, eighth and tenth lens faces of the zoom finder counted from the object side is constructed by an aspherical surface.

As mentioned above, in the zoom finder of the present invention, the zooming operation is performed by fixing the first and third lens groups and moving the second lens group. When the zooming operation is performed from a low magnification to a high magnification, the second lens groups L2 and L20 are displaced from the object side to the eye pupil side.

FIG. 2 is a view showing the arrangement of principal points at a time of the low magnification in the zoom finder having each of the first to fourth structures. FIG. 2 concretely relates to Embodiment 1 described later.

A distance between principal points of the lenses L1 and L2 must be first reduced to make compact the zoom finder having each of the first to fourth structures and composed of four lenses in three lens groups by reducing an entire length of this zoom lens. If a shape of the lens L1 is flat and convex, the principal point of the lens L1 is located on the eye pupil side. Accordingly, the distance between the principal points of the lenses L1 and L2 can be minimized, but aberrations are increased.

When the above condition (1-I) is satisfied, curvatures of the object side lens face and the eye pupil side lens face of the lens L1 are approximately equal to each other. Accordingly, the entire length of the zoom finder can be reduced by effectively correcting the aberrations without greatly increasing the distance between the principal points of the lenses L1 and L2.

The aberrations can be more preferably corrected by setting at least one face of the single lens L1 to an aspherical surface.

As shown in FIG. 2, a principal point of the third lens group is located on the eye pupil side with respect to a principal point of the positive single lens L4 of the third lens group. To reduce the entire length of the zoom finder, it is preferable to increase a distance S between a position of the principal point of the third lens group and a position of the principal point of the lens L4 so that the lenses L3 and L4 constituting the third lens group are located on the object side as much as possible so as not to prevent the lens L2 from being moved onto the eye pupil side at a high magnification time.

$F_3$ is set to a combinational focal length of the third lens group. Reference numeral d is set to a distance between the principal points of the lenses L3 and L4. $f_{3P}$ is set to a focal length of the positive single lens L4 of the third lens group. In this case, the above distance S is represented by the following formula (1).

$$S=(F_3 \cdot d/f_{3P})-d \qquad (1)$$

A focal length $f_{3N}$ of the negative single lens L3 of the third lens group is provided by the following formula (2).

$$f_{3N}=F_3(d-f_{3P})/(F_3-f_{3P}) \qquad (2)$$

When the above formula (2) is differentiated with respect to $f_{3P}$, the following formula (3) is obtained.

$$df_{3N}/df_{3P}=F_3(d-F_3)/(F_3-f_{3P})^2 \qquad (3)$$

Since $d<F_3$ is set, the right-hand side of the formula (3) is negative. Accordingly, it should be understood from the formula (3) that $f_{3N}$ is decreased ($df_{3N}<0$) if $f_{3P}$ is increased ($df_{3P}>0$).

With reference to the formula (1), it should be understood that $f_{3P}$ is preferably decreased and refracting power of the lens L4 is therefore increased to increase the above distance S. However, as mentioned above, when $f_{3P}$ is decreased, $f_{3N}$ is increased so that negative refracting power of the lens L3 is increased.

In the zoom finder of the present invention, the frame system as an albada section is formed by the eye pupil side face of the lens L3 and the lens L4 as mentioned above. Accordingly, the radius $R_6$ of curvature of the eye pupil side lens face of the lens L3 is necessarily determined if the focal length $f_{3P}$ of the lens L4, the lens face distance $D_6$ between the lenses L3 and L4 on an optical axis of the zoom finder in FIG. 1, and a central thickness $D_7$ of the lens L4 in FIG. 1 are determined.

As mentioned above, when $f_{3P}$ is reduced to increase the distance S, it is necessary to increase the refracting power of the lens L3. However, the radius $R_6$ of curvature of the eye pupil side lens face of the lens L3 must be set to be large to a certain extent for formation of the frame. Therefore, curvature of the object side lens face of the lens L3 must be set to be large to increase the negative refracting power of the lens L3. In such a situation, it is desirable to satisfy the above condition (1-II) so as to preferably correct aberrations while effects provided by the reduction in entire length of the zoom finder and a high zoom ratio are held.

When the ratio $|f_{3N}|/R_6$ in the condition (1-II) exceeds an upper limit thereof, no effects of the reduction in entire length of the zoom finder can be sufficiently obtained. In contrast to this, when the ratio $|f_{3N}|/R_6$ in the condition (1-II) exceeds a lower limit thereof, a displacing region of the lens L2 is limited by the lens L3. Accordingly, it is difficult to obtain a high zoom ratio and preferably correct the aberrations.

As shown in Embodiments described later, the entire length of the zoom finder can be set to be equal to or shorter than 29 mm and the zoom ratio can be set to be equal to or greater than 1.8 by satisfying both the conditions (1-I) and (1-II).

As explained above, curvature of the object side lens face of the negative lens of the third lens group is necessarily very large in the zoom finder having each of the first to fourth structures.

When the zoom finder is constructed by three lens groups having positive, negative and positive refracting powers from the object side to the eye pupil side, a light beam from the second lens group is incident to a lens face or the third lens group on a most object side at an incident angle large with respect to the optical axis of the zoom finder. Therefore, when curvature of the most object side lens face of the third lens group is large as in the zoom finder having each of the first to fourth structures, large aberrations shown by the inclination of an image tend to be caused. To avoid such aberrations, it is necessary to satisfy the above conditions (1-I) and (1-II).

The entire zoom finder having the fifth structure is constructed by three lens groups having positive, negative and positive refracting powers. The third lens group is constructed by a negative single lens L30, a positive single lens L40 and a positive single lens L50 sequentially arranged from an object side to an eye pupil side. Further, a half mirror is arranged on an eye pupil side face of the positive single lens L40.

In accordance with such a fifth structure, no half mirror is formed on an eye pupil side face of the negative single lens L30 as a most object side lens of the third lens group. Therefore, the required refracting power of this single lens L30 can be allocated to curvatures of both lens faces of this single lens L30. Thus, the curvature of an object side lens face of the single lens L30 can be set to be reduced in comparison with the zoom finder constructed by four lenses in three lens groups in each of the first to fourth structures. Accordingly, it is possible to effectively restrain an image face from being inclined without satisfying the above conditions (1-I) and (1-II). Further, since the curvature of the object side lens face of the negative single lens L30 is reduced, it is easy to secure a space for moving the negative single lens L20 of the second lens group in a zooming operation at a high magnification time.

FIG. 7a is a view showing the arrangement of principal points at a low magnification time in the zoom finder of the present invention. FIG. 7b is a view showing the arrangement of principal points of the third lens group. As shown in FIG. 7b, a distance between principal points is set to be positive in an eye pupil direction with a black circle as a starting point. FIGS. 7a and 7b concretely relate to Embodiment 4 described later.

In the following description, $f_{12}$ is set to a combinational focal length of a negative single lens L30 and a positive single lens L40 of the third lens group. Further, as described before, $f_{3N}(<0)$ is set to a focal length of the single lens L30, and $f_{3P}'$ is set to a focal length of the positive single lens L40. $d_{12}$ is set to a distance between a rear principal point of the negative single lens L30 and a front principal point of the positive single lens L40. In this case, the combinational focal length $f_{12}$ is provided by the following formula (4) using the focal lengths $f_{3N}$ and $f_{3P}'$ and the distance $d_{12}$.

$$f_{12}=f_{3N} \cdot f_{3P}'/(f_{3N}+f_{3P}'-d_{12}) \tag{4}$$

The combinational focal length $f_{12}$ is negative in a range in which the condition (2-I) in the sixth structure of the present invention is satisfied. In this range, as shown in FIG. 7b, a combined rear principal point is located by a length $S_1$ on an object side of the zoom finder from the rear principal point of the positive single lens L40. In this case, the length $S_1$ is provided as follows.

$$S_1 = f_{3P}' \cdot d_{12}/(f_{3N}+f_{3P}'-d_{12})$$

At this time, $d_{12}$ is small in accordance with the condition (2-I) so that the front and rear principal points at the combinational focal length $f_{12}$ are approximately in conformity with each other.

Therefore, a distance d shown in FIG. 7b can be increased by the length $S_1$ in comparison with a case in which the third lens group is constructed by two lenses having negative and positive refracting powers. Therefore, an entire length of the zoom finder can be further reduced as follows.

Namely, as shown in FIG. 7b, it is necessary to increase a distance S in position between a front principal point of the third lens group and the front principal point of the positive single lens L40 to reduce the entire length of the zoom finder by five lenses in three lens groups in the fifth structure of the present invention. The distance S is provided by the following formula (5) using the above combinational focal length $F_3$ of the third lens group, the distance d and a focal length $f_{3P}''$ of the positive single lens L50 of the third lens group.

$$S=(F_3 \cdot d/f_{3P}'')-d(>0) \tag{5}$$

When this formula (5) is differentiated with respect to the distance d, the following formula is obtained.

$$dS/dd=(F_3/f_{3P}'')-1(>0)$$

Accordingly, if the distance d is increased as mentioned above in accordance with the above condition (2-I), the distance S is increased so that the entire length of the zoom finder can be reduced. Thus, it is possible to obtain effects according to the lens construction of the fifth structure of the present invention.

When the third lens group is constructed by two lenses having negative and positive refracting powers as in the zoom finder having each of the first to fourth structures, a distance between these two lenses of the third lens group is increased by increasing the distance d so that no entire length of the zoom finder is necessarily reduced.

In the zoom finder having each of the fifth and sixth structures, it is desirable to satisfy the condition (2-II) in accordance with the seventh structure of the present invention.

When $|f_{3N}|/F_3$ in the condition (2-II) exceeds an upper limit thereof, it is difficult to effectively reduce the entire length of the zoom finder. In contrast to this, when $|f_{3N}|/F_3$ in the condition (2-II) exceeds a lower limit thereof, refracting powers of the two positive single lenses L40 and L50 of the third lens group are increased so that it is difficult to correct aberrations. In particular, in the case of the ninth lens structure, the positive single lens L40 is constructed by a positive meniscus lens having a convex face on the object side. Therefore, as refracting power of the negative single lens L30 is increased, it is difficult to secure a required lens edge thickness when refracting power of the single lens L40 is increased.

As shown in the following Embodiments, the entire length of the zoom finder can be set to be equal to or shorter than 30 mm and a zoom ratio can be set to be equal to or greater than 1.8 by satisfying both the conditions (2-I) and (2-II).

Further objects and advantages of the present invention will be apparent from the following description of the preferred embodiments of the present invention as illustrated in the accompanying drawings.

BRIEF DESCRIPTION OF THE DRAWINGS

FIGS. 9a–9e are aberrational diagrams of the zoom finder at a telescopic end and a finder frame with respect to Embodiment 4;

FIGS. 10a–10f are aberrational diagrams of the zoom finder at a wide angle end and an intermediate focal length with respect to Embodiment 5; and FIGS. 11a–11e are aberrational diagrams of the zoom finder at a telescopic end and a finder frame with respect to Embodiment 5.

DESCRIPTION OF THE PREFERRED EMBODIMENTS

The preferred embodiments of a zoom finder in the present invention will next be described in detail with reference to the accompanying drawings.

Figure 1:
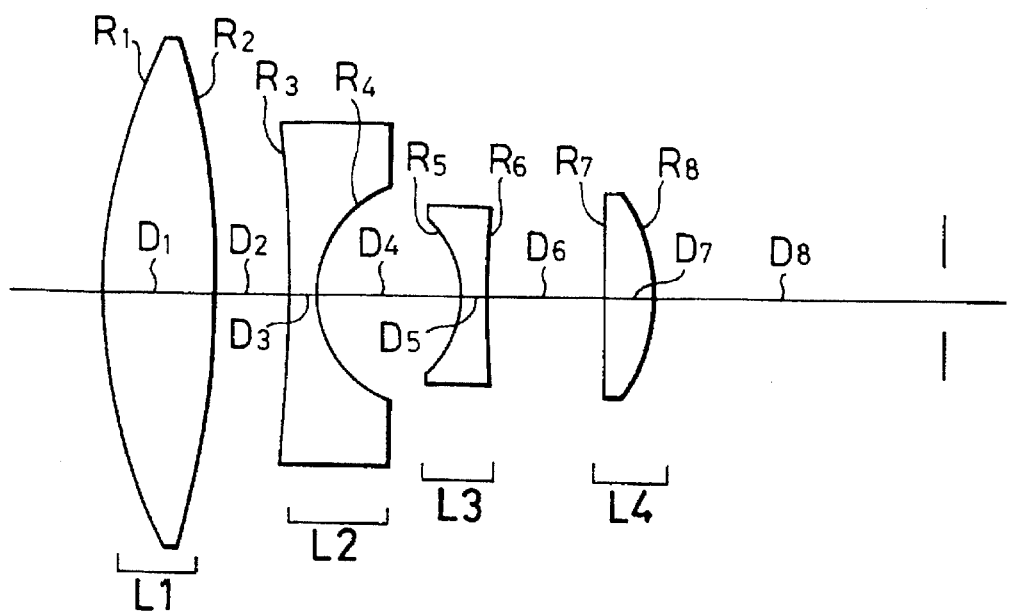
FIG. 1 is a view for explaining the lens construction of a zoom finder having each of first to fourth structures of the present invention.
Figure 2:
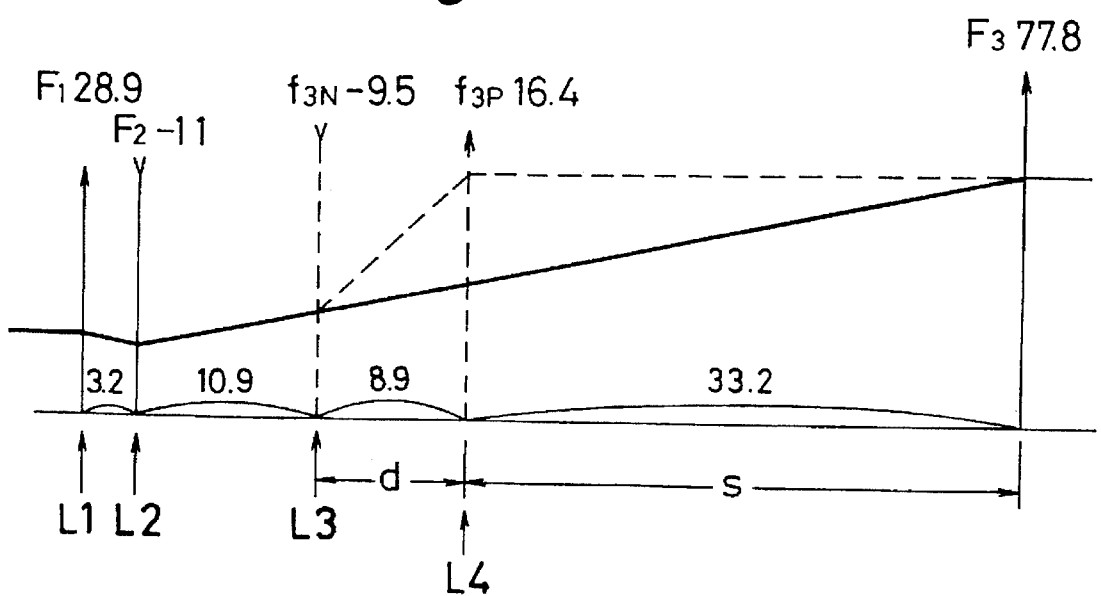
FIG. 2 is a view for explaining an operation of the zoom finder having each of the first to fourth structures of the present invention in relation to Embodiment 1.

Concrete Embodiments of the present invention will next be described. Embodiments 1 to 3 are embodiments of a zoom finder having each of first to fourth structures of the present invention. As shown in FIG. 1, $R_i$ (i=1 to 8) designates a radius of curvature of an i-th lens face counted from an object side of the zoom finder. $D_i$ (i=1 to 7) designates a distance between the i-th lens face and an (i+1)-th lens face on an optical axis of the zoom finder. $D_8$ designates a distance between an eighth lens face as a final lens face counted from the object side and an eye pupil point position on the optical axis of the zoom finder. $N_j$ designates a refractive index of the material of a j-th lens counted from the object side with respect to line d. An entire length of the zoom finder is provided by adding $D_1$ to $D_7$ to each other.

A Z-axis is set to be in conformity with the optical axis of the zoom finder. Y is set to a coordinate in a direction perpendicular to the optical axis of the zoom finder. In this case, an aspherical surface is obtained by rotating a curve represented by the following formula around the optical axis of the zoom finder.

$$Z=(Y^2/R)/[1+\sqrt{1-(1+K)Y^2/R^2}]+A\cdot Y^4+B\cdot Y^6+C\cdot Y^8$$

In this formula, K is a conical constant and A, B and C are respectively aspherical coefficients of fourth, sixth and eighth orders. A shape of the aspherical surface is specified by giving the conical constant K and the aspherical coefficients A, B and C.

Embodiment 1

| i | $R_i$ | $D_i$ | j | $N_j$ |
|---|---|---|---|---|
| 1 | 28.661 | 5.96 | 1 | 1.49154 |
| 2 | −26.150 | variable | | |
| 3 | −97.802 | 1.30 | 2 | 1.49154 |
| 4 | 5.730 | variable | | |
| 5 | −5.130 | 1.30 | 3 | 1.49154 |
| 6 | 58.000 | 6.30 | | |
| 7 | ∞ | 2.63 | 4 | 1.49154 |
| 8 | −8.050 | 15.00 | | |

Variable amounts

| zooming point | wide angle end | telescopic end |
|---|---|---|
| magnification | 0.317 | 0.578 |
| $D_2$ | 0.4 | 7.05 |
| $D_4$ | 10.75 | 4.1 |

Aspherical Surfaces

Second face
 K=−13.327, A=6.393×10$^{-6}$, B=−1.118×10$^{-8}$, C=0.00
Fourth face
 K=−0.200, A=−1.622×10$^{-4}$, B=3.234×10$^{-6}$, C=0.00
Fifth face
 K=−1.480, A=−4.540×10$^{-4}$, B=−5.010×10$^{-5}$, C=2.730×10$^{-7}$
Sixth face
 K=156.146, A=−1.199×10$^{-4}$, B=−8.520×10$^{-6}$, C=0.00
Eighth face
 K=−2.968, A=−5.011×10$^{-4}$, B=1.763×10$^{-6}$, C×0.00
Parametric values of conditional formula $R_1/|R_2|=1.1$, $|f_{3N}|/R_6=0.16$ entire length: 28.64, zoom ratio: 1.823

Embodiment 2

| i | $R_i$ | $D_i$ | j | $N_j$ |
|---|---|---|---|---|
| 1 | 26.128 | 6.22 | 1 | 1.49154 |
| 2 | −26.217 | variable | | |
| 3 | −90.160 | 1.20 | 2 | 1.49154 |
| 4 | 5.444 | variable | | |
| 5 | −5.268 | 1.30 | 3 | 1.49154 |
| 6 | 57.285 | 6.30 | | |
| 7 | ∞ | 2.80 | 4 | 1.49154 |
| 8 | −8.114 | 15.00 | | |

Variable amounts

| zooming point | wide angle end | telescopic end |
|---|---|---|
| magnification | 0.317 | 0.58 |
| $D_2$ | 0.4 | 6.76 |
| $D_4$ | 10.46 | 4.1 |

Aspherical Surfaces

Second face
 K=−15.500, A=5.976×10$^{-6}$, B=−1.143×10$^{-8}$
Fourth face
 K=−0.272, A=−1.465×10$^{-4}$, B=4.533×10$^{-6}$
Fifth face
 K=−1.481, A=−4.420×10$^{-4}$, B=−5.080×10$^{-5}$
Sixth face
 K=145.417, A=−1.289×10$^{-4}$, B=−8.124×10$^{-6}$
Eighth face
 K=−2.982, A=−4.982×10$^{-4}$, B=1.621×10$^{-6}$
Parametric values of conditional formula $R_1/|R_2|=1.0$, $|f_{3N}|/R_6=0.17$ entire length: 28.68, zoom ratio: 1.83

Embodiment 3

| i | $R_i$ | $D_i$ | j | $N_j$ |
|---|---|---|---|---|
| 1 | 28.971 | 5.82 | 1 | 1.49154 |
| 2 | −27.320 | variable | | |
| 3 | −108.880 | 1.00 | 2 | 1.49154 |
| 4 | 5.903 | variable | | |
| 5 | −5.428 | 1.30 | 3 | 1.49154 |
| 6 | 52.086 | 6.30 | | |
| 7 | ∞ | 3.00 | 4 | 1.49154 |
| 8 | −8.300 | 15.00 | | |

Variable amounts

| zooming point | wide angle end | telescopic end |
|---|---|---|
| magnification | 0.317 | 0.58 |
| $D_2$ | 0.4 | 7.35 |
| $D_4$ | 11.1 | 4.15 |

Aspherical surfaces

Second face
 K=−14.857, A=3.945×10$^{-6}$, B=−7.749×10$^{-9}$
Fourth face
 K=−0.254, A=−1.351×10$^{-4}$, B=3.365×10$^{-6}$
Fifth face
 K=−2.296, A=−1.162×10$^{-3}$, B=−2.948×10$^{-5}$
Sixth face
 K=109.798, A=−1.558×10$^{-4}$, B=−6.191×10$^{-6}$
Eighth face
 K=−2.994, A=−4.890×10$^{-4}$, B=1.983×10$^{-6}$
Parametric values of conditional formula $R_1/|R_2|=1.1$, $|f_{3N}|/R_6=0.19$ entire length: 28.92, zoom ratio: 1.83

Figure 3:
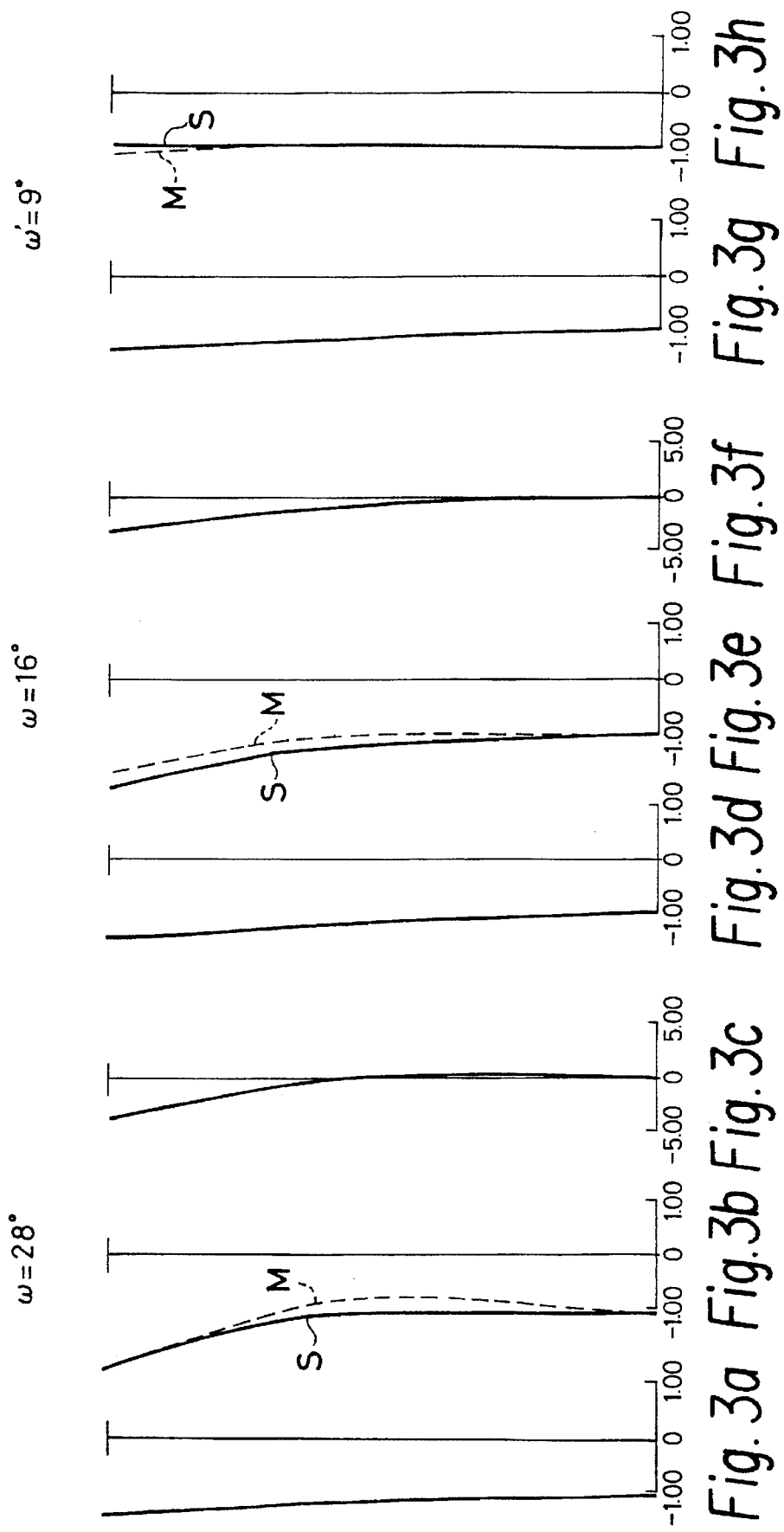
FIGS. 3a–3h are aberrational diagrams of the zoom finder with respect to Embodiment 1.
Figure 4:
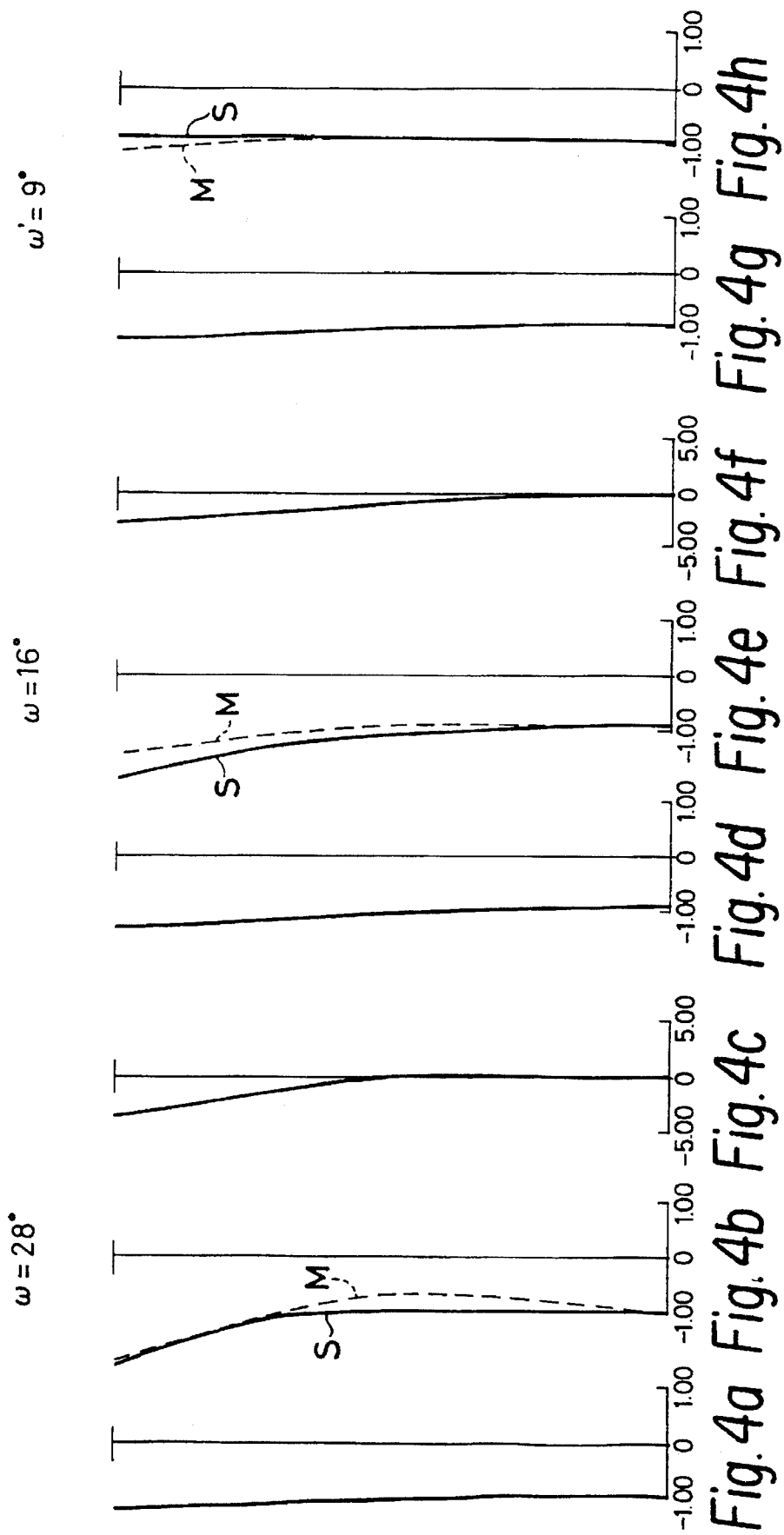
FIGS. 4a–4h are aberrational diagrams of the zoom finder with respect to Embodiment 2.
Figure 5:
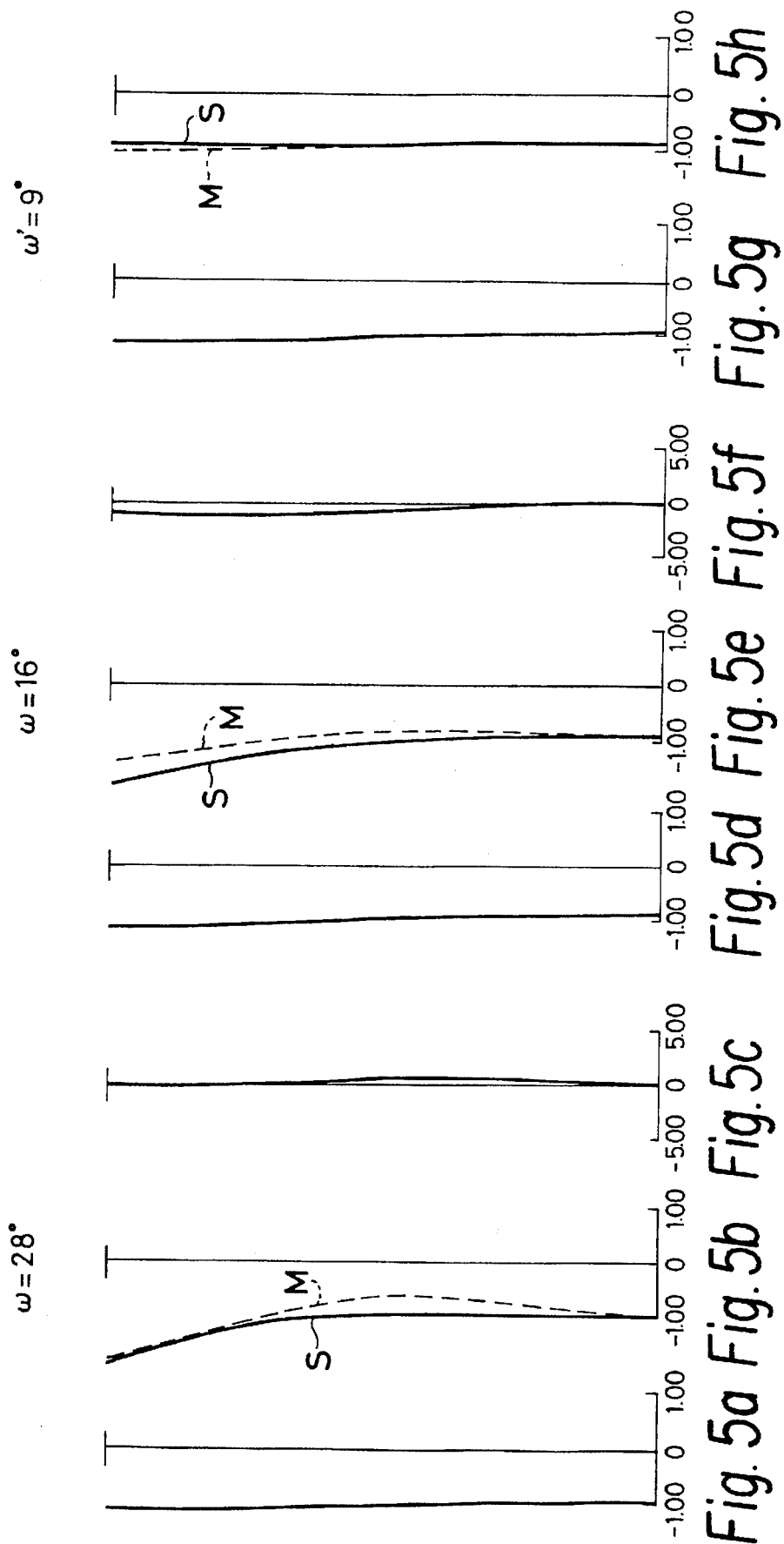
FIGS. 5a–5h are aberrational diagrams of the zoom finder with respect to Embodiment 3.

FIGS. 3a–3h, 4a–4h and 5a–5h respectively show aberrational diagrams of the zoom finder at a wide angle end (FIGS. 3a–3c), (FIGS. 4a–4c) and FIGS. (5a–5c), a telescopic end (FIGS. 3d–3f), (FIGS. 4d–4f), and (FIGS. 5d–5f) and a finder frame (FIGS. 3g–3h), (FIGS. 4g–4h) and (FIGS. 5g–5h) with respect to Embodiments 1 to 3. FIGS. (3a, 3d, 3g), FIGS. (4a, 4d, 4g) and FIGS. (5a, 5d, 5g) illustrate spherical aberration diagrams; FIGS. (3b, 3e, 3h), FIGS. (4b, 4e, 4h) and FIGS. (5b, 5e, 5h) illustrate astigmatism diagrams; and FIGS. (3c, 3f), FIGS. (4c, 4f) and FIGS. (5c, 5f) illustrate distortional aberration diagrams. $\omega$ designates a half field angle. $\omega'$ designates an angle formed between an optical axis of the zoom finder and a principal ray incident to a lens L1 at a field angle $\omega$ when this principal ray is emitted from a lens L4. In astigmatic diagrams, reference numerals S and M respectively designate sagittal and meridional rays. In each of the Embodiments 1 to 3, aberrations are preferably corrected and an entire length of the zoom finder can be set to be equal to or shorter than 29 mm. Further, a zoom ratio of the zoom finder can be set to be equal to or greater than 1.8.

The following Embodiments 4 and 5 are concrete embodiments of a zoom finder having each of fifth to ninth structures.

Figure 6:
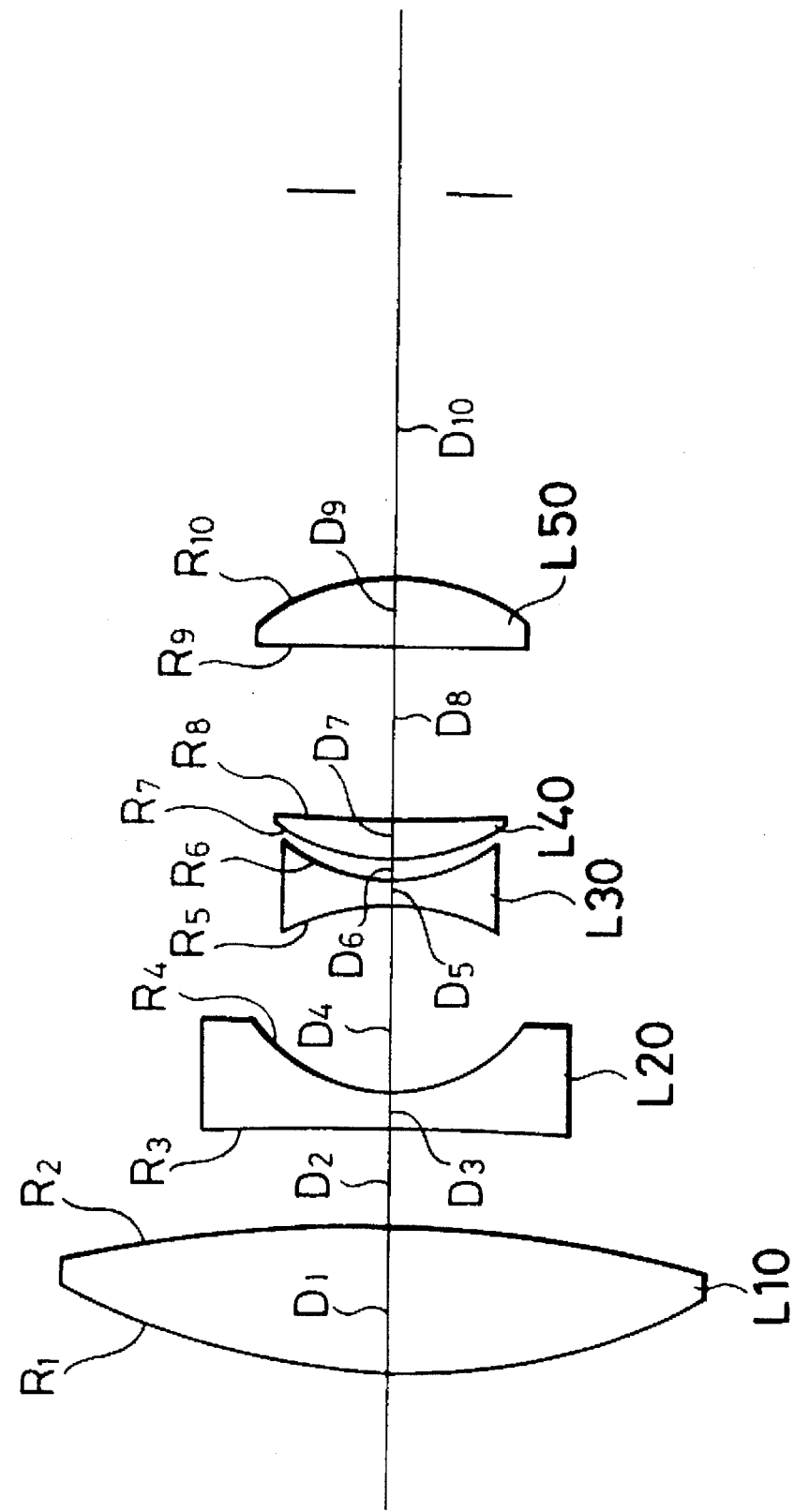
FIG. 6 is a view for explaining the lens construction of a zoom finder having each of fifth to ninth structures of the present invention.
Figure 7A:
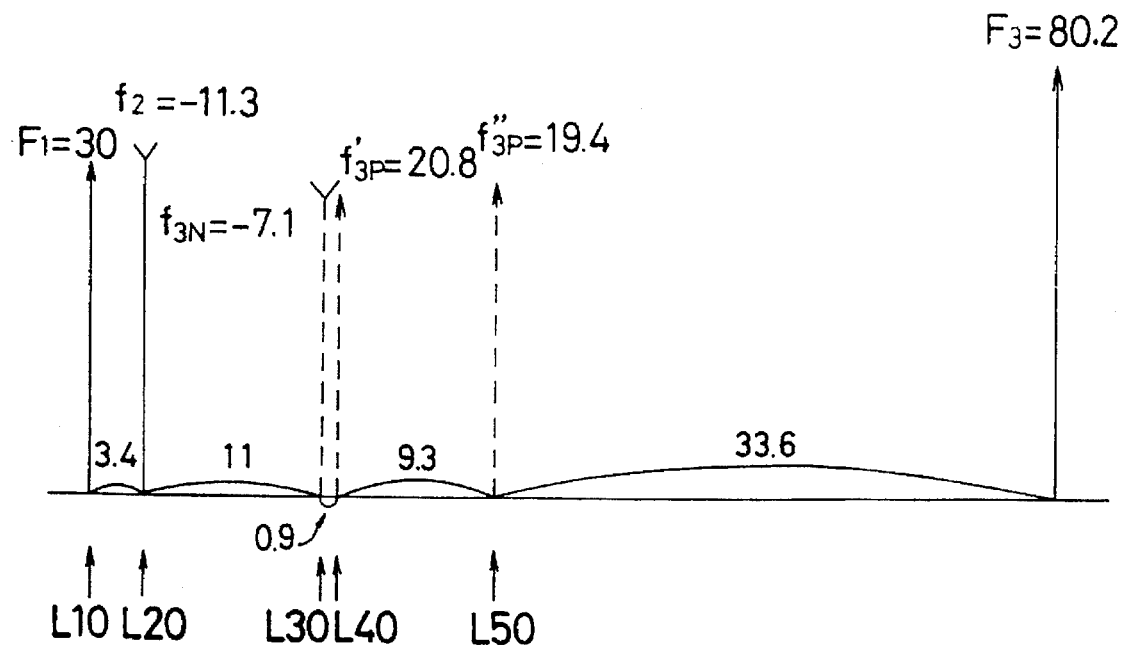
FIGS. 7a and 7b are views for explaining an operation of the zoom finder having each of the fifth to ninth structures of the present invention in relation to Embodiment 4.
Figure 7B:
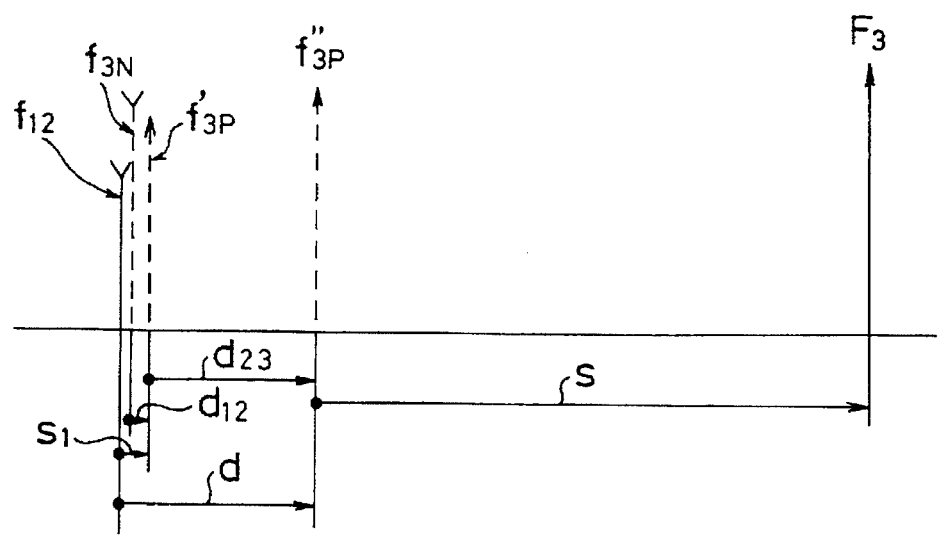
Figures 8A, 8B, 8C:
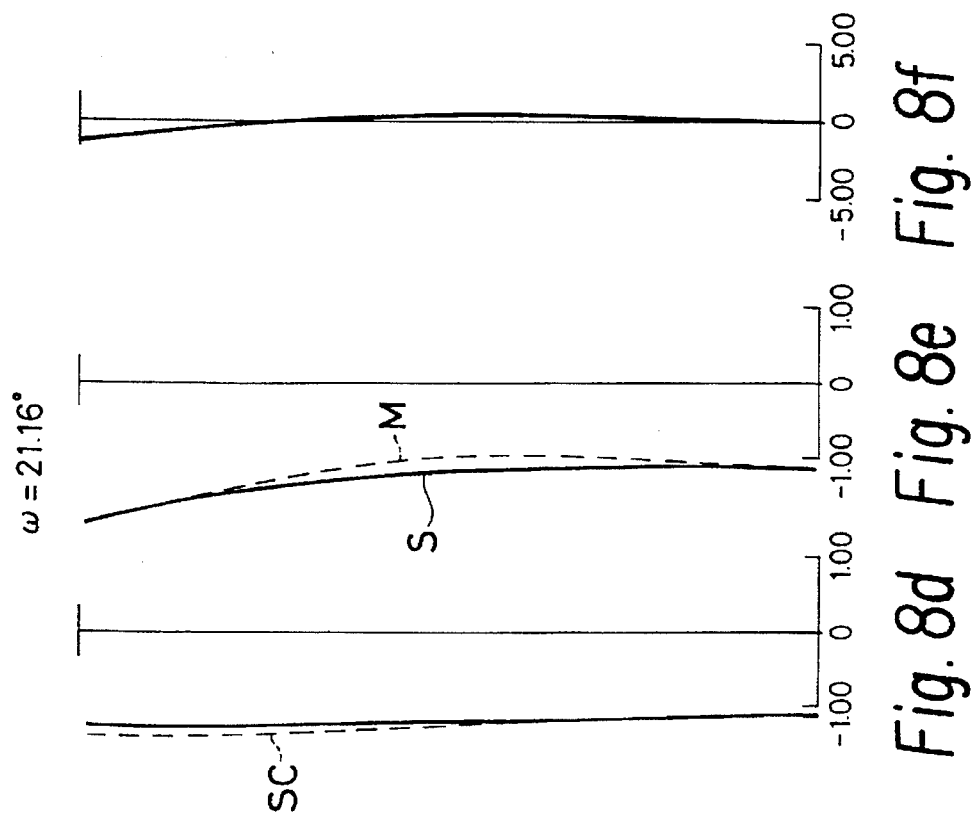
FIGS. 8a–8f are aberrational diagrams of the zoom finder at a wide angle end and an intermediate focal length with respect to Embodiment 4.
Figures 8D, 8E, 8F:
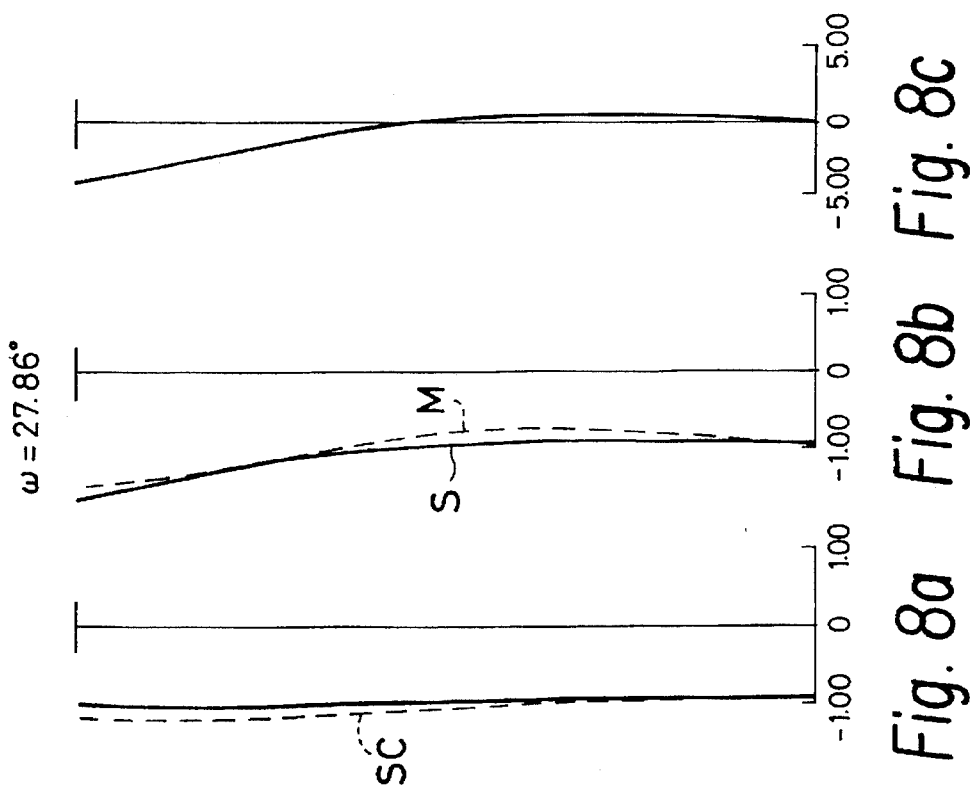

As shown in FIG. 6, $R_i$ (i=1 to 10) designates a radius of curvature of an i-th lens face counted from an object side of the zoom finder. $D_i$ (i=1 to 9) designates a distance between the i-th lens face and an (i+1)-th lens face on an optical axis of the zoom finder. $D_{10}$ designates a distance between a tenth lens face as a final lens face counted from the object side and an eye pupil point position on the optical axis of the zoom finder. $N_j$ designates a refractive index of the material of a j-th lens counted from the object side with respect to line d. An entire length of the zoom finder is provided by adding $D_1$ to $D_9$ to each other.

Similar to the Embodiments 1 to 3, the shape of an aspherical surface is specified by giving the conical constant K and the aspherical coefficients A, B and C.

Embodiment 4

| i | $R_i$ | $D_i$ | j | $N_j$ |
|---|---|---|---|---|
| 1 | 25.319 | 5.64 | 1 | 1.49154 |
| 2 | −32.608 | variable | | |
| 3 | −119.108 | 1.30 | 2 | 1.49154 |
| 4 | 5.859 | variable | | |
| 5 | −8.577 | 1.00 | 3 | 1.49154 |
| 6 | 6.039 | 0.91 | | |
| 7 | 7.941 | 1.30 | 4 | 1.49154 |
| 8 | 33.593 | 6.60 | | |
| 9 | ∞ | 2.30 | 5 | 1.49154 |
| 10 | −9.530 | 15.00 | | |

Variable amounts

| zooming point | wide angle end | intermediate focal length | telescopic end |
|---|---|---|---|
| magnification | 0.317 | 0.421 | 0.58 |
| $D_2$ | 0.4 | 3.86 | 7.32 |
| $D_4$ | 10.52 | 7.06 | 3.6 |

Aspherical Surfaces

Second face
K=−22.014, A=8.454×10$^{-6}$, B=−1.813×10$^{-8}$
Fourth face
K=−0.962, A=2.662×10$^{-4}$, B=1.355×10$^{-5}$
Fifth face
K=−2.687, A=−3.88×10$^{-5}$, B=−1.134×10$^{-5}$
Eighth face
K=1.458, A=−4.679×10$^{-5}$, B=−1.639×10$^{-6}$
Tenth face
K=−2.996, A=−3.314×10$^{-4}$, B=−2.15×10$^{-7}$
Parametric values of conditional formula $|f_{3N}|/f_{3P}'=0.3$, $d_{12}/f_{3P}'=0.04$, $|f_{3N}|/F_3=0.088$ entire length: 29.97, zoom ratio: 1.83

Embodiment 5

| i | $R_i$ | $D_i$ | j | $N_j$ |
|---|---|---|---|---|
| 1 | 23.634 | 5.76 | 1 | 1.49154 |
| 2 | −34.101 | variable | | |
| 3 | −127.010 | 1.20 | 2 | 1.49154 |
| 4 | 5.679 | variable | | |
| 5 | −8.711 | 1.00 | 3 | 1.49154 |
| 6 | 6.375 | 0.90 | | |
| 7 | 8.408 | 1.30 | 4 | 1.49154 |
| 8 | 33.701 | 6.60 | | |
| 9 | ∞ | 2.50 | 5 | 1.49154 |
| 10 | −9.585 | 15.00 | | |

Variable amounts

| zooming point | wide angle end | intermediate focal length | telescopic end |
|---|---|---|---|
| magnification | 0.317 | 0.421 | 0.58 |
| $D_2$ | 0.4 | 3.77 | 7.14 |
| $D_4$ | 10.34 | 6.97 | 3.6 |

Aspherical Surfaces

Second face
K=−25.833, A=8.874×10$^{-6}$, B=−1.841×10$^{-8}$
Fourth face
K=−0.832, A=2.114×10$^{-4}$, B=1.453×10$^{-5}$
Fifth face
K=−3.296, A=−7.385×10$^{-5}$, B=−1.22×10$^{-5}$
Eighth face
K=1.115, A=−4.718×10$^{-5}$, B=−1.654×10$^{-6}$
Tenth face
K=−3.046, A=−3.345×10$^{-4}$, B=2.869×10$^{-7}$
Parametric values of conditional formula $|f_{3N}|/f_{3P}'=0.3$, $d_{12}/f_{3P}'=0.04$, $|f_{3N}|/F_3=0.094$ entire length: 30, zoom ratio: 1.83

FIGS. 8a–8f show aberrational diagrams of the zoom finder at a wide angle end (FIGS. 8a–8e) and an intermediate focal length in a mean state (FIGS. 8d–8f) with respect to Embodiment 4. FIGS. (8a, 8d) illustrate spherical aberration diagrams; FIGS. (8b, 8e) illustrate astigmatism diagrams; and FIGS. (8c, 8f) illustrate distortional aberration diagrams. FIGS. 9a–9e show aberrational diagrams of the zoom finder at a telescopic end (FIGS. 9a–9c) and a finder frame (FIGS. 9d–9e) with respect to Embodiment 4. FIGS. (9a, 9d) illustrate spherical aberration diagrams; FIGS. (9b, 9e) illustrate astigmatism diagrams; and FIG. 9c illustrates a distortional aberration diagram. FIGS. 10a–10c show aberrational diagrams of the zoom finder at a wide angle end and an intermediate focal length in a mean state (FIGS. 10d–10f) with respect to Embodiment 5. FIGS. (10a, 10d) illustrate spherical aberration diagrams; FIGS. (10b, 10e) illustrate astigmatism diagrams; and FIGS. 10c, 10f) illustrate distortional aberration diagrams. FIGS. 11a–11e show aberrational diagrams of the zoom finder at a telescopic end (FIGS. 11a–11c) and a finder frame (FIGS 11d–11e) with respect to Embodiment 5. FIGS. (11a, 11d) illustrate spherical aberration diagrams; FIGS. (11b, 11e) illustrate astigmatism diagrams; and FIG. 11c illustrates a distortional aberration diagram. ω designates a half field angle. ω' designates an angle formed between an optical axis of the zoom finder and a principal ray incident to a lens L10 at a field angle ω when this principal ray is emitted from a lens L50. In astigmatic diagrams, reference numerals S and M respectively designate sagittal and meridional rays and in the spherical aberration diagrams reference letter SC designates a sine condition. In each of the Embodiments 4 and 5, aberrations are preferably corrected and an entire length of the zoom finder can be set to be equal to or shorter than 30 mm. Further, a zoom ratio of the zoom finder can be set to be equal to or greater than 1.8.

As mentioned above, the entire length of a novel zoom finder having each of first to ninth structures of the present invention is short and this zoom finder has a high zoom ratio. Further, aberrations of the zoom finder are preferably corrected.

Many widely different embodiments of the present invention may be constructed without departing from the spirit and scope of the present invention. It should be understood that the present invention is not limited to the specific embodiments described in the specification, except as defined in the appended claims.

What is claimed is:

1. A zoom finder consisting of first to third lens groups sequentially arranged from an object side to an eye pupil side and performing a zooming operation by fixing the first and third lens groups and moving the second lens groups;

the first lens group consisting of a positive single lens;

the second lens group consisting of a negative single lens;

the third lens group having a positive combinational focal length and consisting of a negative single lens arranged on the object side and a positive single lens arranged on the eye pupil side;

a frame system of the zoom finder being formed by an eye pupil side lens face of the negative single lens of the third lens group and the positive single lens of the third lens group;

radii $R_1$ and $R_2$ of curvature of lens faces of the first lens group respectively on the object and eye pupil sides satisfying the following condition, $$0.8 < R_1/R_2 < 1.2 \tag{1-I}$$

and at least one lens face of the first lens group being constructed by an aspherical surface.

2. A zoom finder as claimed in claim 1, wherein a focal length $f_{3N}$ of the negative single lens of the third lens group and a radius $R_6$ of curvature of the eye pupil side lens face of the negative single lens of the third lens group satisfy the following condition, $$0.15 < |f_{3N}|/R_6 < 0.2 \tag{1-II}$$

3. A zoom finder as claimed in claim 1 or 2, wherein the first lens group consists of a biconvex lens, the second lens group consists of a biconcave lens, the negative single lens of the third lens group consists of a biconcave lens, and the positive single lens of the third lens group consists of a flat convex lens.

4. A zoom finder as claimed in claim 3, wherein each of second, fourth, fifth, sixth and eighth lens faces of the zoom finder counted from the object side consists of an aspherical surface.

5. A zoom finder consisting of first to third lens groups sequentially arranged from an object side to an eye pupil side and performing a zooming operation by fixing the first and third lens groups and moving the second lens group;

the first lens group consisting of a positive single lens;

the second lens group consisting of a negative single lens;

the third lens group having a positive combinational focal length and consisting of a negative single lens, a first positive single lens and a second positive single lens sequentially arranged from the object side of the eye pupil side; and a frame system of the zoom finder being constructed by a half mirror formed on an eye pupil side lens of the first positive single lens of the third lens group and a frame formed on an object side lens face of the second positive single lens of the third lens group.

6. A zoom finder as claimed in claim 5, wherein a focal length $f_{3N}$ (<0) of the negative single lens of the third lens group, a focal length $f_{3P}'$ of the first positive single lens of the third lens group, and a distance $d_{12}$ between a rear principal point of said negative single lens of the third lens group and a front principal point of the first positive single lens of the third lens group satisfy the following conditions, $$|f_{3N}|/f_{3P}' < 0.5 \tag{2-I}$$

and $$d_{12}/f_{3P}' < 0/1.$$

7. A zoom finder as claimed in claim 5 or 6, wherein a focal length $f_{3N}$ of the negative single lens of the third lens group and a combinational focal length $F_3$ of the third lens group satisfy the following condition, $$0.08 < |f_{3N}|/F_3 < 0.1 \tag{2-II}$$

8. A zoom finder as claimed in claim 7, wherein the positive single lens of the first lens group, the negative single lens of the second lens group, the negative single lens of the third lens group, the first positive single lens of the third lens group, and the second positive single lens of the third lens group respectively consist of a biconvex lens, a biconcave lens, a biconcave lens, a positive meniscus lens having a convex face on the object side, and a flat convex lens.

9. A zoom finder as claimed in claim 8, wherein each of second, fourth, fifth, eighth and tenth lens faces of the zoom finder counted from the object side consists of an aspherical surface.

10. A zoom finder comprising first to third lens groups sequentially arranged from an object side to an eye pupil side and performing a zooming operation by fixing the first and third lens groups and moving the second lens group;

the first lens group comprising a positive single lens;

the second lens group comprising a negative single lens;

the third lens group having a positive combinational focal length and comprising a negative single lens arranged on the object side and a positive single lens arranged on the eye pupil side;

a frame system of the zoom finder being formed by an eye pupil side lens face of the negative single lens of the third lens group and the positive single lens of the third lens group;

radii of curvature $R_1$ and $R_2$ of lens faces of the first lens group respectively on the object and eye pupil sides satisfying the following condition, $$0.8 < R_1/R_2 < 1.2 \tag{1-I}$$

and at least one lens face of the first lens group comprises an aspherical surface.

11. A zoom finder having first to third lens groups sequentially arranged from an object side to an eye pupil side and performing a zooming operation by fixing the first and third lens groups and moving the second lens group;

the first lens group comprising a positive single lens;

the second lens group comprising a negative single lens;

the third lens group having a positive combinational focal length and comprising a negative single lens, a first positive single lens and a second positive single lens sequentially arranged from the object side to the eye pupil side; and a frame system of the zoom finder comprising a half mirror formed on an eye pupil side lens face of the first positive single lens of the third lens group and a frame formed on an object side lens face of the second positive single lens of the third lens group.

* * * * *